Jan. 3, 1961 C. T. WALKER 2,966,790
WASHABILITY TESTER
Filed July 27, 1956

INVENTOR.
CHARLES T. WALKER
BY
ATTORNEY

2,966,790
Patented Jan. 3, 1961

United States Patent Office

2,966,790
WASHABILITY TESTER

Charles T. Walker, Louisville, Ky., assignor to Reynolds Metals Co., Louisville, Ky., a corporation of Delaware Filed July 27, 1956, Ser. No. 600,507

3 Claims. (Cl. 73—7)

This invention relates to testing apparatus of the type used to test resistance of materials to washing conditions.

It is often desirable to ascertain the washability or washing properties of painted or similarly coated surfaces. The resistance of various coated surfaces to a washing action becomes important in selecting a suitable finish for a particular application and it may be very useful in connection with the development of new and improved finishes. Heretofore, only complicated and expensive apparatus has been available for testing washability, whereas in some other forms of testing, such as abrasion testing, simple, easily operated testing apparatus has been provided.

Accordingly, the principal object of my invention is to provide a new, improved and relatively inexpensive apparatus for testing the washability of various test specimens.

Other important objects of my invention are: to provide a new and improved washability tester which is composed of a small number of parts; to provide one which is easily and quickly set up to accommodate test specimens; and to provide one which contains a simple arrangement of all of the necessary washing testing implements which can be easily and quickly applied to the test specimen to accurately determine its washability.

My invention resides in the novel adaptation of an abrasion testing apparatus into a device for testing the washability of a flat-surfaced specimen. The abrasion tester used contains a rotatably driven, turn-table which accommodates the specimen to be tested. In the abrader, a pivotable arm mounted on the tester base carries the abrasion tools which may be brought against the surface of the specimen to perform the abrading testing procedure. In my invention, the abrading tools are removed and washability testing implements substituted. These washing implements may be moved into the operative position in the same manner as in the abrader against the specimen to test the washability of its surface.

This invention is illustrated in the accompanying drawing wherein.

The illustrated embodiment of my invention comprises a washability tester which is adapted from an abrasion testing apparatus known generally as a Taber abraser and manufactured by the Taber Instrument Co. of North Tonawanda, New York.

Figure 1:
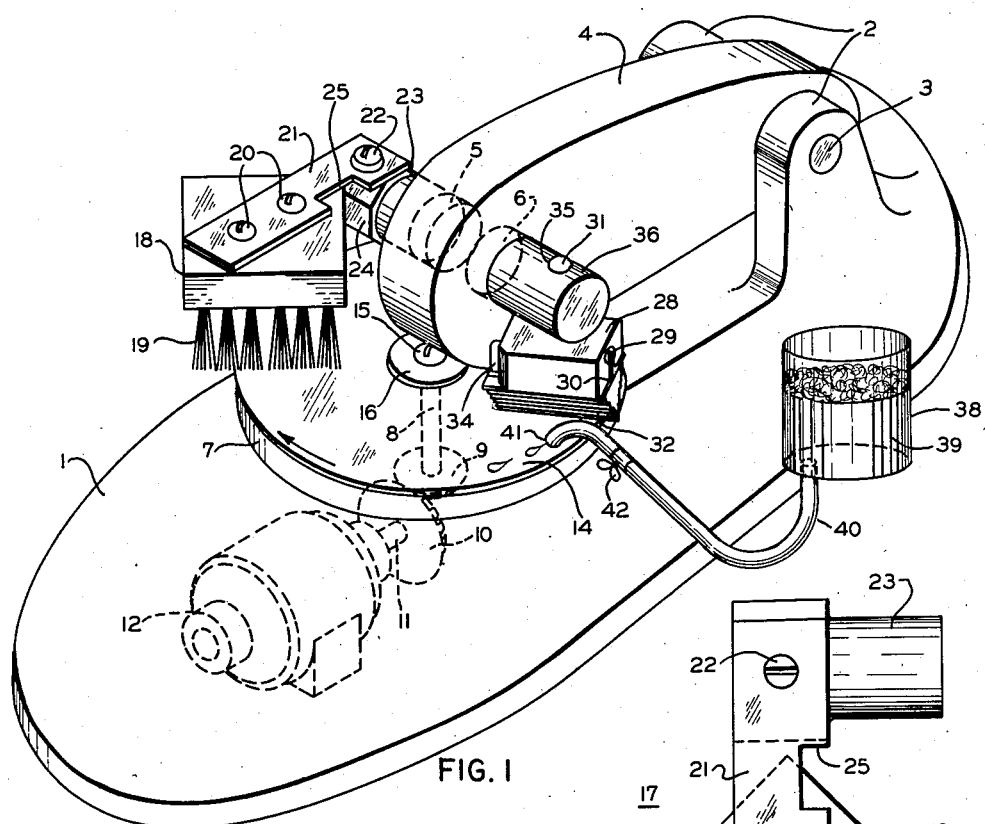
Fig. 1 is a perspective view of my invention.

My testing apparatus consists of a base 1 which is preferably weighted or provided with any suitable type of mounting arrangement to hold the apparatus firmly in position and reduce vibrations during the testing operation. The base 1 is provided with a pair of upstanding lugs 2 at the top rear of the base which are suitably bored to provide bearing pedestals for a freely rotatable shaft 3 positioned intermediate the lugs. An elongated arm 4 is fixedly mounted on the shaft 3 and is freely pivotable therewith. The pivotable arm 4 extends centrally along the top of the base 1 as shown in Fig. 1 and is provided with a pair of cylindrical recesses or openings 5, 6 on opposite sides of its forward or free end. These recesses are preferably coaxially aligned as shown in Fig. 1 but if desired may be spaced axially in any appropriate position.

In order to position the specimen to be tested within the apparatus, a turn-table 7, preferably circular, is centrally arranged on the top of the base 1 beneath the free end of the arm 4 and is preferably fixedly mounted on a generally vertical shaft 8 for rotation therewith arranged within the interior of the base 1 as shown in Fig. 1. Although any suitable means may be used for driving the turn-table 7, shaft 8 is preferably provided with a bevel gear 9 at its lower end which meshes with another bevel gear 10 keyed to the shaft 11 of driving means such as an electric motor 12 arranged internally within the interior of the base 1. If desired, the gears may be eliminated and the shaft 8 may be an extension of the drive shaft of a vertically mounted motor.

The turn-table 7 is arranged to receive a circular test specimen 14 having a flat surface which conforms generally to the circular dimensions of the turn-table 7. The specimen is preferably provided with a central opening (not shown) through which securing means such as a threaded bolt 15 may pass to fixedly secure the specimen 14 to the upper surface of the turn-table 7. The upper end of the shaft 8 on which the turn-table 7 is mounted is preferably centrally threaded to receive the bolt 15 and, by means of a washer 16, a tight clamping of the specimen 14 to the turn-table 7 is assured.

The structure described above comprises the Taber abrasion tester. As should be understood, the recesses 5, 6 of the apparatus of Fig. 1 are utilized to fixedly mount abrasion wheels for testing the abrasion resisting characteristics of the specimen positioned on the turn-table 7. In my invention, these abrasion testing wheels have been removed and washability testing means are mounted instead in the recesses 5, 6 as shown in Fig. 1.

Figure 2:
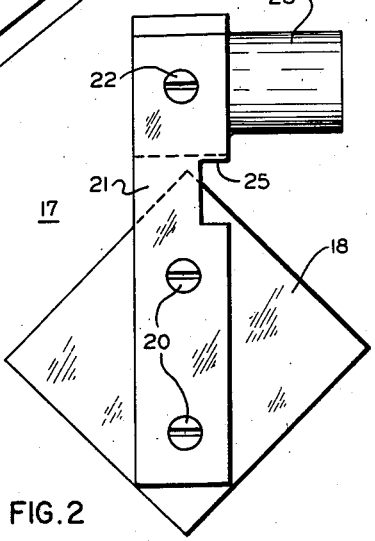
Fig. 2 is a plan view of my scrubbing implement.

Fig. 2 shows the scrubber or brush 17 which is used in my washability tester. The brush 17 consists of a base 18, preferably rectangular in shape, into the underside of which are imbedded a plurality of bristles 19 as shown in Fig. 1. The brush base 18 is secured by means such as screws 20 to one end of a flexible supporting strip 21. The strip 21 is secured at its end opposite the brush by means such as screw 22 to a cylindrical support member 23 as shown clearly in Fig. 1. The cylindrical support member 23 contains a hexagonal end portion 24, one of the flat surfaces of which serves as a rest for the end of the strip 21, and is provided with a threaded recess (not shown) into which the attaching screw 22 is inserted. In addition, a section of the strip 21 along its central portion is removed at 25 to permit a certain degree of flexibility in the strip. This notch 25 enables the brush bristles 19 to resiliently engage the surface of the test specimen 14.

It will be noted that the diameter of the cylindrical support member 23 which supports the brush 17 is such that it can be snugly pressed or otherwise fitted into the lateral recess 5 of the pivotable arm 4 and securely held in the position of Fig. 1.

Figure 3:
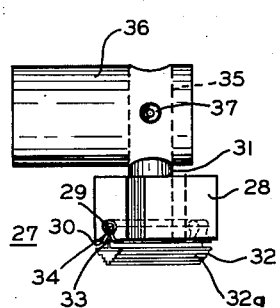
Fig. 3 is a plan view of my wiper implement.

Fig. 3 shows another component part of my washability tester which consists of a wiper 27. The wiper 27 consists of a supporting body 28 preferably rectangular in shape, containing a transverse bore 29. The underside of the body 28 is slotted to provide a downwardly depending transverse slot 30 which opens into the bore 29. The base 28 also contains an integral upstanding shank 31 which is preferably cylindrical in shape.

In order to achieve the desired wiping action in my washability tester, the wiper 27 is provided with a blade 32 composed of a molded flexible material such as rubber or plastic and having a plurality of ridges 32a. The wiper blade 32 is formed as a downwardly depending triangular blade and contains an upwardly extending, integrally molded flat portion 33. The wiper blade 32 is attached to the body 28 by placing a hairpin-shaped clip 34 over the wiper blade flat portion 33 as shown in Fig. 3. The clip 34 and the wiper blade flat portion 33 are then forcibly inserted into the narrow slot 30 in the wiper body 28. The slot 30 constricts the clip 34 and forces it into tight gripping engagement with the wiper blade flat portion 33. The wiper blade 32 is thus held securely within the wiper body 28.

In order to attach the wiper 27 to the testing apparatus of Fig. 1, the upstanding shank 31 of the wiper is arranged to be received within a transverse bore 35 of a second cylindrical support member 36 and is securely positioned therein by means such as a set screw 37. As can be seen in Fig. 1, the cylindrical support member 36 is of such diameter that it can be snugly pressed or otherwise fitted into the lateral recess 6 of the pivotable arm 4 on the side of the arm opposite that of the brush 17 and securely held therein in the position shown in Fig. 1.

Thus, as noted in Fig. 1, the brush 17 and wiper 27 are supported by the pivotable arm 4 in such a position that the brush bristles 19 and wiper blade 32 are preferably positioned at substantially opposite sides of the surface of the specimen 14 which is to be tested for washability.

In order to provide the necessary washing agent for the test, a cleansing agent or soap solution may be conducted to the upper surface of the test specimen 14 by any suitable means. A preferred arrangement for adding the washing agent is shown in Fig. 1 where reservoir 38 containing a soap solution 39 is arranged adjacent the testing apparatus. It should be understood that the reservoir 38 may be supported on the testing apparatus or may be supported by any suitable external means. A discharge pipe 40 is connected to the bottom of the reservoir 38 and contains a lower end 41 which is suspended over the specimen 14 so that the soap solution 39 flowing in the pipe 40 may drip directly thereon. The rate of flow of the soap solution from the pipe end 41 may be controlled by a valve member 42 arranged within the discharge pipe 40.

In the operation of my testing apparatus, the supporting arm 4 is pivoted upwardly and rearwardly and a circular test specimen 14 having a central opening is placed on the turn-table 7. Of course, the surface of the specimen which is to be tested faces upwardly. The test specimen 14 is then securely held to the turn-table by inserting the threaded bolt 15 carrying the washer 16 through the specimen and into the threaded center recess of the shaft 8. The brush 17 and the wiper 27 are then tightly pressed or otherwise securely mounted by means of their associated cylindrical supporting members 23, 36 within the arm openings 5, 6 respectively. The turntable 7 and consequently the specimen 14 are then rotated by energizing the driving motor 12 in the base 1 of the apparatus.

The pivotable arm 4 is then moved forwardly and downwardly bringing the brush bristles 19 and wiper blade 23 against the surface of the rotating specimen 14. The soap solution 39 within the reservoir 38 is permitted to drip from the end 41 of the tube 40 at the desired rate by opening the valve 42. Thus, the brushing action of the bristles 19 and the wiping action of the wiper 23 together with the added soap solution 39 impose a continuous and severe washing action on the surface finish of the test specimen 14 to indicate the resistance of the surface finish to washing conditions.

It can thus be seen that with the novel arrangement of this invention an abrasion tester which is readily available on the market may be quickly and effectively adapted to test the washability of a specimen of material. Only the abrading tools used on the abrasion tester need be removed and replaced by the novel washing tools of the invention. These washing tools are simple and inexpensive and are positioned on the testing apparatus in a similar manner to the abrading tools where they can be brought into washing contact with a test specimen rotated by the apparatus.

Having described my invention, I claim:

1. A washability tester for a specimen presenting a flat surface comprising: a base; a turn-table rotationally mounted thereon, said table being adapted to support and rotationally carry said specimen; means to rotate the turn-table; an arm pivoted on the base for movement between an operative position adjacent the turn-table and an inoperative position away therefrom; and washability testing means detachably carried by the arm in position to be held against the surface of a specimen on said turntable when said arm is in its operative position, said testing means including a scrubbing brush and a wiper, each being operatively positioned at different locations such that a portion of a rotating specimen is successively engaged by the brush and wiper.

2. The tester of claim 1 wherein: said scrubbing brush and wiper are mounted on opposite sides of said arm.

3. The tester of claim 2 including: means for conducting a soap solution to a portion of the rotating surface of the specimen after it is engaged by said wiper and before it is engaged by said brush.

References Cited in the file of this patent

UNITED STATES PATENTS

| | | |
|---|---|---|
| 1,267,905 | Richardson | May 28, 1918 |
| 2,287,148 | Taber | June 23, 1942 |
| 2,295,798 | McKinley | Sept. 15, 1942 |
| 2,343,837 | Wheeler | Mar. 7, 1944 |
| 2,455,966 | Ackley | Dec. 14, 1948 |
| 2,712,751 | Bracco et al. | July 12, 1955 |

OTHER REFERENCES

"Physical and Chemical Examination, Paints, Varnishes, Lacquers, Colors," by Gardner and Sward, 11th ed. 1950, pages 396 C, 367, 396 B.